United States Patent
Wu et al.

(10) Patent No.: US 11,135,673 B2
(45) Date of Patent: Oct. 5, 2021

(54) WELDING DEVICE AND PROCESSING APPARATUS FOR SECONDARY BATTERY CURRENT COLLECTOR

(71) Applicant: Contemporary Amperex Technology Co., Limited, Ningde (CN)

(72) Inventors: Congmiao Wu, Ningde (CN); Zhiqiang Guo, Ningde (CN); Zuyu Wu, Ningde (CN); Jianfeng Li, Ningde (CN); Guodong Li, Ningde (CN); Taosheng Zhu, Ningde (CN)

(73) Assignee: Contemporary Amperex Technology Co., Limited

( * ) Notice: Subject to any disclaimer, the term of this patent is extended or adjusted under 35 U.S.C. 154(b) by 111 days.

(21) Appl. No.: 16/282,898

(22) Filed: Feb. 22, 2019

(65) Prior Publication Data

US 2019/0283171 A1    Sep. 19, 2019

(30) Foreign Application Priority Data

Mar. 15, 2018 (CN) .......................... 201820355900.1

(51) Int. Cl.
| | | |
|---|---|---|
| B23K 20/10 | (2006.01) | |
| H01M 4/66 | (2006.01) | |
| H01M 4/64 | (2006.01) | |
| B23K 101/38 | (2006.01) | |

(52) U.S. Cl.
CPC ............ B23K 20/103 (2013.01); H01M 4/64 (2013.01); H01M 4/661 (2013.01); H01M 4/667 (2013.01); *B23K 2101/38* (2018.08)

(58) Field of Classification Search
CPC ............ B23K 20/103–106; B23K 1/06; B23K 2101/38; B23K 20/04; H01M 4/64; H01M 4/661; H01M 4/667

USPC .................................. 228/235.2, 110.1, 1.1
See application file for complete search history.

(56) References Cited

U.S. PATENT DOCUMENTS

| | | | | |
|---|---|---|---|---|
| 2,558,093 A | * | 6/1951 | Kinney, Jr. .......... | B23K 20/227 228/186 |
| 3,193,169 A | * | 7/1965 | Arnold ................. | B23K 20/103 228/1.1 |
| 3,361,318 A | * | 1/1968 | Nowisch .............. | B23K 20/103 228/1.1 |

(Continued)

FOREIGN PATENT DOCUMENTS

| | | |
|---|---|---|
| DE | 3218920 | 11/1983 |
| DE | 29912490 | 2/2001 |

(Continued)

OTHER PUBLICATIONS

Database WPI Week 201581 Thomson Scientific, London; GB; AN 2015-75123N & JP 2015 213945 A (Toyota Jidosha KK) Dec. 3, 2015.

*Primary Examiner* — Kiley S Stoner
(74) *Attorney, Agent, or Firm* — Forge IP, PLLC

(57) ABSTRACT

The present disclosure relates to a welding device and a processing apparatus for a secondary battery current collector. The welding device includes: a welding head; and an anvil block. A welding station is disposed between the welding head and the anvil block. The welding device is configured to weld a foil to a portion of a composite current collector at the welding station. According to this solution, the foil can be used as a tab of the composite current collector by using the foil to connect with the composite current collector so as to output the current in the battery cell.

10 Claims, 6 Drawing Sheets

(56) References Cited

U.S. PATENT DOCUMENTS

| | | | | |
|---|---|---|---|---|
| 3,507,038 A * | 4/1970 | Maier | H01L 39/2403 | |
| | | | 29/599 | |
| 3,948,705 A * | 4/1976 | Ausnit | B29C 66/7392 | |
| | | | 156/73.4 | |
| 4,162,757 A * | 7/1979 | Lemelson | A44B 18/0049 | |
| | | | 228/1.1 | |
| 4,187,408 A * | 2/1980 | Heile | B23K 26/08 | |
| | | | 219/121.64 | |
| 4,455,191 A * | 6/1984 | Tatum, Sr. | B29C 65/086 | |
| | | | 156/580.2 | |
| 4,477,011 A * | 10/1984 | Austin | B23K 20/04 | |
| | | | 228/173.2 | |
| 4,824,744 A * | 4/1989 | Kuo | H01M 4/04 | |
| | | | 228/173.2 | |
| 4,825,533 A * | 5/1989 | Hayashi | H01F 5/00 | |
| | | | 228/110.1 | |
| 5,082,160 A * | 1/1992 | Leigh | B23K 20/103 | |
| | | | 228/1.1 | |
| 5,553,770 A * | 9/1996 | Jha | B23K 35/0238 | |
| | | | 228/190 | |
| 5,871,138 A * | 2/1999 | Shishido | B21B 15/0085 | |
| | | | 228/102 | |
| 5,942,314 A * | 8/1999 | Fisher | B23K 20/10 | |
| | | | 428/198 | |
| 6,096,145 A * | 8/2000 | Pandey | B23K 20/04 | |
| | | | 148/527 | |
| 6,419,149 B1 * | 7/2002 | Yano | B23K 20/02 | |
| | | | 228/235.1 | |
| 6,499,647 B1 | 12/2002 | Martin | | |
| 6,722,002 B1 * | 4/2004 | Chang | B21B 1/38 | |
| | | | 29/17.2 | |
| 8,220,696 B2 * | 7/2012 | Kawada | H05K 3/0097 | |
| | | | 228/179.1 | |
| 2002/0062903 A1 * | 5/2002 | Couillard | B29C 66/8242 | |
| | | | 156/73.1 | |
| 2002/0195478 A1 * | 12/2002 | Yamano | B29C 65/18 | |
| | | | 228/110.1 | |
| 2003/0041953 A1 * | 3/2003 | Farell | D04H 1/555 | |
| | | | 156/181 | |
| 2010/0040903 A1 * | 2/2010 | Kalt | H01L 24/78 | |
| | | | 428/615 | |
| 2011/0311852 A1 * | 12/2011 | Mineya | H01M 10/0587 | |
| | | | 429/94 | |
| 2012/0017641 A1 * | 1/2012 | Friedl | B23K 20/106 | |
| | | | 65/29.11 | |
| 2012/0288756 A1 * | 11/2012 | Kim | H01M 4/043 | |
| | | | 429/208 | |
| 2013/0078365 A1 * | 3/2013 | Mori | C23C 18/1262 | |
| | | | 427/58 | |
| 2013/0112735 A1 * | 5/2013 | Luechinger | H01L 31/0504 | |
| | | | 228/110.1 | |
| 2013/0326865 A1 * | 12/2013 | Kobayashi | H01M 4/139 | |
| | | | 29/623.1 | |
| 2014/0320992 A1 * | 10/2014 | Denkmann | B32B 7/12 | |
| | | | 359/883 | |
| 2015/0158247 A1 * | 6/2015 | Heeg | B29C 66/83411 | |
| | | | 156/73.1 | |
| 2016/0107211 A1 * | 4/2016 | Kagawa | H01G 11/70 | |
| | | | 72/203 | |
| 2016/0155996 A1 * | 6/2016 | Dai | H01M 2/263 | |
| | | | 429/179 | |
| 2017/0103857 A1 * | 4/2017 | Kagawa | B26F 1/20 | |
| 2017/0120505 A1 * | 5/2017 | Nakano | H01M 2/145 | |
| 2019/0217413 A1 * | 7/2019 | Yamashita | H01M 4/64 | |
| 2019/0283172 A1 * | 9/2019 | Wu | B32B 37/203 | |
| 2019/0358739 A1 * | 11/2019 | Hahnlen | B23K 37/04 | |
| 2020/0035986 A1 * | 1/2020 | Hoschen | H01M 4/0404 | |

FOREIGN PATENT DOCUMENTS

| | | | | |
|---|---|---|---|---|
| FR | 2225247 A1 * | 11/1974 | | B29C 65/08 |
| GB | 930859 A * | 7/1963 | | B21B 15/0085 |
| JP | 57109504 A * | 7/1982 | | B21B 15/0085 |
| JP | 60184482 A * | 9/1985 | | |
| JP | 03163781 A * | 7/1991 | | |
| JP | 06047406 A * | 2/1994 | | |
| JP | 2015213945 | 12/2015 | | |

\* cited by examiner

WELDING DEVICE AND PROCESSING APPARATUS FOR SECONDARY BATTERY CURRENT COLLECTOR

CROSS-REFERENCE TO RELATED APPLICATIONS

The present application claims priority to Chinese Patent Application No. 201820355900.1, filed on Mar. 15, 2018, the content of which is incorporated herein by reference in its entirety.

TECHNICAL FIELD

The present disclosure relates to the field of energy storage device processing technologies, and in particular, to a welding device and a processing apparatus for a secondary battery current collector.

BACKGROUND

In lithium batteries, an aluminum foil is usually adopted as a positive current collector, and a copper foil is adopted as a negative current collector. With the continuous development of the battery industry, a current collector with better performance can be adopted.

SUMMARY

With the continuous development of the battery industry, there has been a composite current collector composed of high polymer and metal. The composite current collector can reduce the temperature rise of the battery, reduce the risk of thermal runaway, and improve the safety of the battery. However, since the composite current collector includes an insulating layer formed of high polymer material, the tab of the composite current collector cannot output the current in the battery cell to the electrode terminal, which requires using the foil (an aluminum foil or a copper foil) to transfer-connect with the tab of the composite current collector such that the current in the battery cell is output.

The present disclosure provides a welding device and a processing apparatus for a secondary battery current collector, which can achieve the connection of the foil with the composite current collector so as to output the current in the battery cell.

The present disclosure provides a welding device for a secondary battery current collector, comprising: a welding head; and an anvil block. A welding station is disposed between the welding head and the anvil block. The welding device is configured to weld a foil to a portion of a composite current collector at the welding station.

In an embodiment, the welding device is configured to continuously weld the foil to the portion of the composite current collector at the welding station.

In an embodiment, the welding head is configured as an ultrasonic welding head, the ultrasonic welding head being in rolling contact with the anvil block.

In an embodiment, a plurality of extrusion welding teeth is arranged on an outer circumferential face of one of the ultrasonic welding head and the anvil block.

The present disclosure also provides a processing apparatus for a secondary battery current collector. The processing apparatus includes: a foil uncoiling roller; a composite current collector uncoiling roller; a conveying roller; a coiling roller; and the welding device according to any one of the above aspects. Both the foil uncoiling roller and the composite current collector uncoiling roller are disposed on a feeding side of the welding device, and the coiling roller is disposed on a discharging side of the welding device. The welding device is configured to weld the foil to a portion of the composite current collector at the welding station.

In an embodiment, the processing apparatus further includes a driving device. One of the welding head and the anvil block is coupled to the driving device in a transmission way to adjust a contact force therebetween when they contact with each other.

In an embodiment, the processing apparatus further includes a first pressure roller and a second pressure roller provided in pairs. The first pressure roller and the second pressure roller have a gap therebetween for passage of the composite current collector and the foil, and the foil and the composite current collector are overlapped in the gap. The first pressure roller is disposed on a discharging side of the foil uncoiling roller and the feeding side of the welding device, and the second pressure roller is disposed on a discharging side of the composite current collector uncoiling roller and the feeding side of the welding device.

In an embodiment, the processing apparatus further includes a pre-pressure roller configured to press one of the foil and the composite current collector to the other of the foil and the composite current collector to make the foil and the composite current collector overlap. The pre-pressure roller is disposed on a feeding side of the first pressure roller and the second pressure roller.

In an embodiment, the processing apparatus further includes a rectifying device configured to rectify a position offset of the foil from the composite current collector. The rectifying device is disposed on a feeding side of the pre-pressure roller.

In an embodiment, the processing apparatus further includes a tension adjusting device. The tension adjusting device is movably disposed to adjust tension of the foil and the composite current collector.

The technical aspect provided by the present disclosure can achieve the following beneficial effects.

The present disclosure provides a processing apparatus for a secondary battery current collector. The welding device can weld a foil input to the welding station to a portion of a composite current collector, so that the foil can be used as a tab of the composite current collector and the current in the battery cell can be output with the transfer of the foil.

It should be understood that the above general description is merely illustrative, but not intended to limit the present disclosure.

REFERENCES SIGNS

10—foil uncoiling roller;
20—composite current collector uncoiling roller;
30—welding device;
302—welding head;
304—anvil block;
40—coiling roller;
45—conveying roller;
50—driving device;
60—first pressure roller;
70—second pressure roller;
75—pre-pressure roller;
80—rectifying device.

Accompanying drawings illustrating embodiments according to the present disclosure are incorporated in the description as a part, and used to elaborate the principle of the present disclosure.

DESCRIPTION OF EMBODIMENTS

The present disclosure will be further described below by specific embodiments of the present disclosure in combination with the drawings.

It should be understood that terms indicating orientations or positions, such as "up", "down", "left", "right", etc., generally are used to describe the orientations or positions with reference to the drawings, and thus should not be construed as a limitation to the embodiments of the present disclosure. It also should be understood that when an element is referred as being "on" or "under" another element, the element can be directly located "on" or "under" another element or connected to another element with an intermediate element.

The present disclosure provides a processing method for a secondary battery current collector, and this processing method can weld a composite current collector and a foil together to output electrical energy stored in the battery cell to an electrode terminal of the secondary battery through the foil.

The foil may be an aluminum foil or a copper foil, in which an aluminum foil is applied to the positive electrode and a copper foil is applied to the negative electrode. Correspondingly, a composite current collector containing metal aluminum is applied to the positive electrode, and a composite current collector containing metal copper is applied to the negative electrode.

Figure 1:
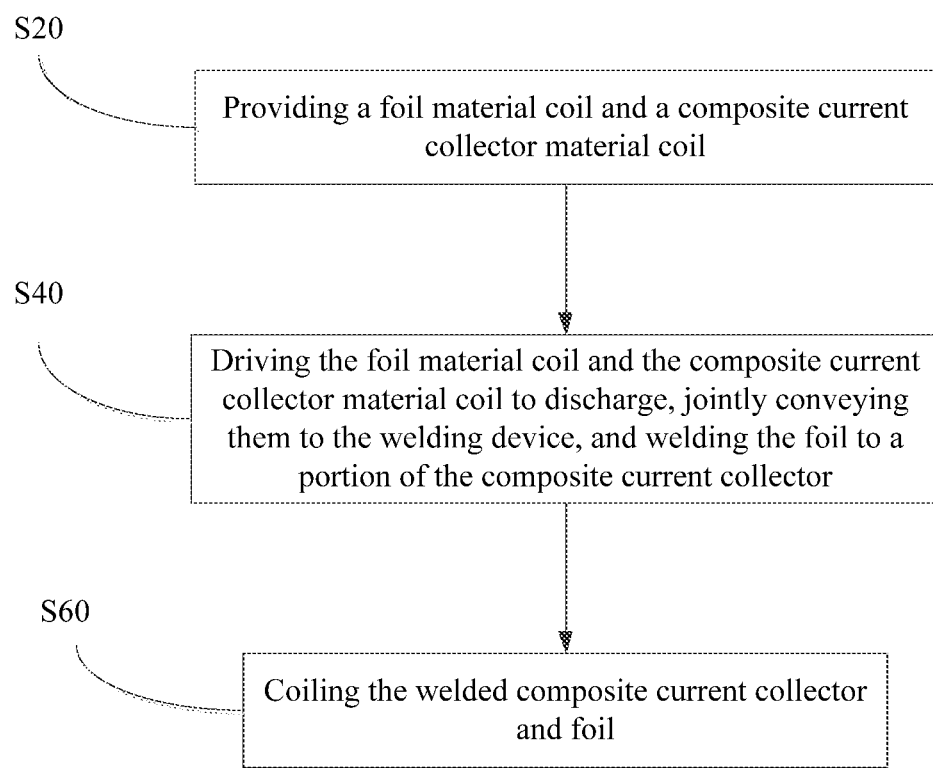
FIG. 1 is a flowchart of a processing method for a secondary battery current collector according to an embodiment of the present disclosure.

As shown in FIG. 1, the processing method may include the following steps.

At Step S20, a foil material coil and a composite current collector material coil are provided. The foil and the composite current collector are strip materials and are wound around a discharging roller to form a material coil.

At Step S40, the foil material coil and the composite current collector material coil are driven to discharge. For example, each discharging roller can be mounted on a shaft through a bearing, and under driving of an external force, each discharging roller rotates to achieve the discharge of the foil material coil and the composite current collector material coil. The external force can be a conveying force provided by a conveying roller.

After discharging, the single layer foil and the single layer composite current collector, as an upper layer and a lower layer, respectively, are jointly conveyed to the welding device, which in turn fixes the foil to a portion of the composite current collector by welding.

At Step S60, the composite current collector and the foil material fixed together after welding are coiled on the coiling roller. The coiling roller can be driven to rotate by an electric device such as a motor, and a coiling force applied by the coiling roller to the foil and the composite current collector can also be used as an external force to drive the discharging roller to rotate and discharge.

According to the above description, this processing method can weld the foil to the composite current collector. In this way, the foil can be used as a tab of the composite current collector, such that the current in the battery cell can be output through the transfer of the foil.

In the present disclosure, in step S40, the method for welding the foil and the composite current collector is not specifically limited. In one embodiment, the foil and the composite current collector can be laser-welded.

Figure 2:
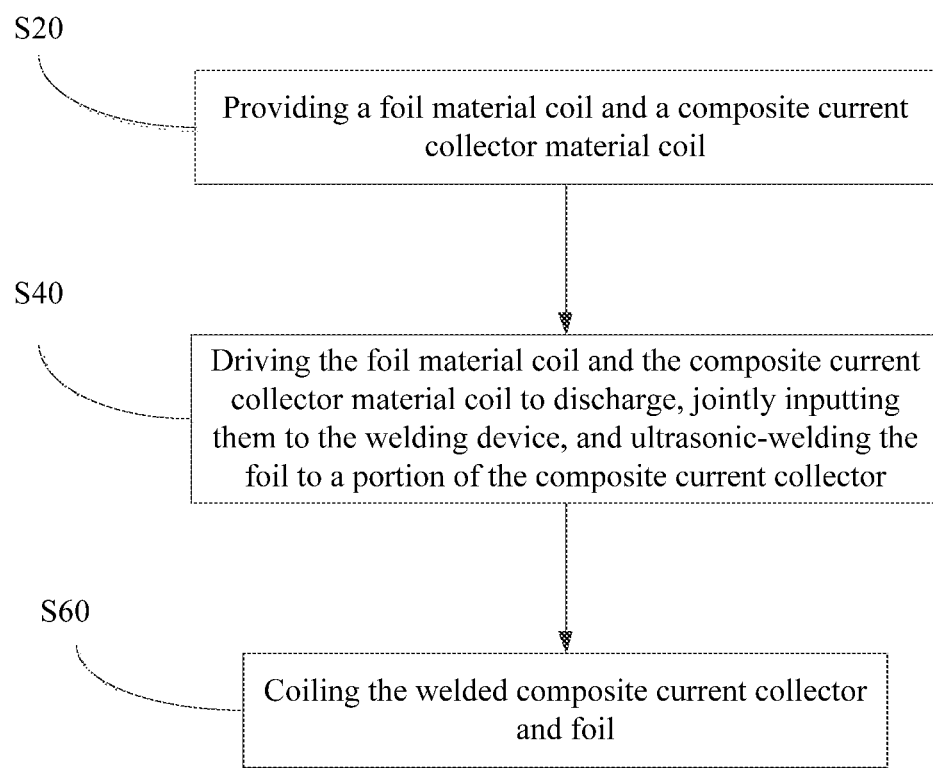
FIG. 2 is a flowchart of a first embodiment of a processing method for a secondary battery current collector according to an embodiment of the present disclosure.

In other embodiments, as shown in FIG. 2, the foil and the composite current collector may also be ultrasonic-welded. Ultrasonic welding is to transmit high-frequency vibration waves to surfaces of two objects to be welded, such that the surfaces of the two objects rub against each other to form a fusion between molecular layers in the case of increasing pressure. As regarding to a composite current collector, the middle layer thereof is a plastic layer and the plastic layer is provided with a metal layer on both sides. Ultrasonic welding can effectively penetrate the plastic layer in the middle and fuse the foil with the metal layers on both sides to increase the thickness of the metal, such that the current in the battery cell can be reliably output from the fused portion.

Figure 3:
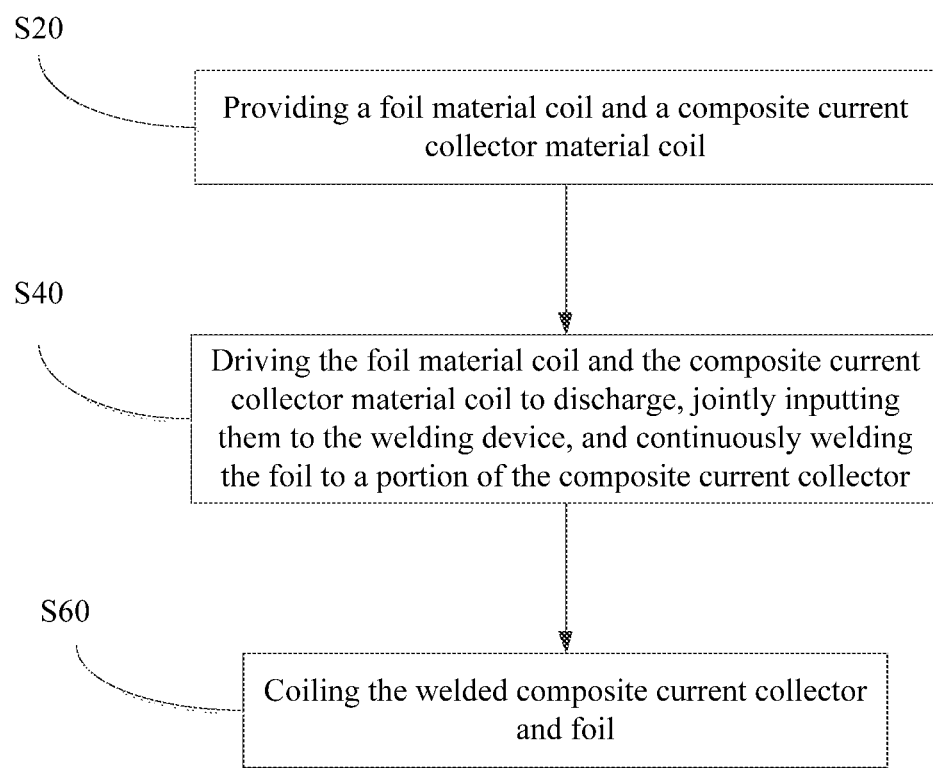
FIG. 3 is a flowchart of a second embodiment of a processing method for a secondary battery current collector according to an embodiment of the present disclosure.

Further, as shown in FIG. 3, in step S40, the foil may be continuously welded to a portion of the composite current collector. That is, the foil and the composite current collector are welded during the conveying process such that continuous welding marks are formed on them. This solution can eliminate the need to stop the foil and the composite current collector during the conveying process, which reduces processing time and increases processing efficiency.

In addition, in ultrasonic welding, conductivity of the fused portion of the welded foil and the composite current collector should also be taken into account. In one embodiment, in step S40, the foil may be input to a side of the welding device close to the welding tooth portion, and correspondingly, the composite current collector is fed into a side of the welding station close to the non-welding tooth portion. The foil is usually rolled from a metal into a thin material, for example, a copper foil is rolled from a copper material and an aluminum foil is rolled from an aluminum material. After arranging in the above manner, during the ultrasonic welding process, the welding tooth portion contacts and presses the foil. Since the plasticity of the copper foil and the aluminum foil is good, the foil is stretched under the action of the pressing force and is firstly fused with the metal layer on the upper side of the plastic layer in the composite current collector. When the extrusion welding teeth continue to penetrate the plastic layer, the stretched foil can pass through the penetration hole to be fused with the metal layer on the lower side of the plastic layer. Thus, the foil is fused with the metal layers on the upper and lower sides of the plastic layer, which results in a higher degree of fusion of the foil and the composite current collector and thus increases conductivity, such that the current in the battery cell can be reliably output.

It should be noted here that the welding device comprises two portions, one of which is a welding tooth portion which comprises extrusion welding teeth and while the other of which is a non-welding tooth portion which can be surface smoothed by grinding or the like to reduce the roughness. The welding tooth portion and the non-welding tooth portion have a welding station located therebetween. The foil and the composite current collector can pass through the welding station and then be welded together.

Figure 4:
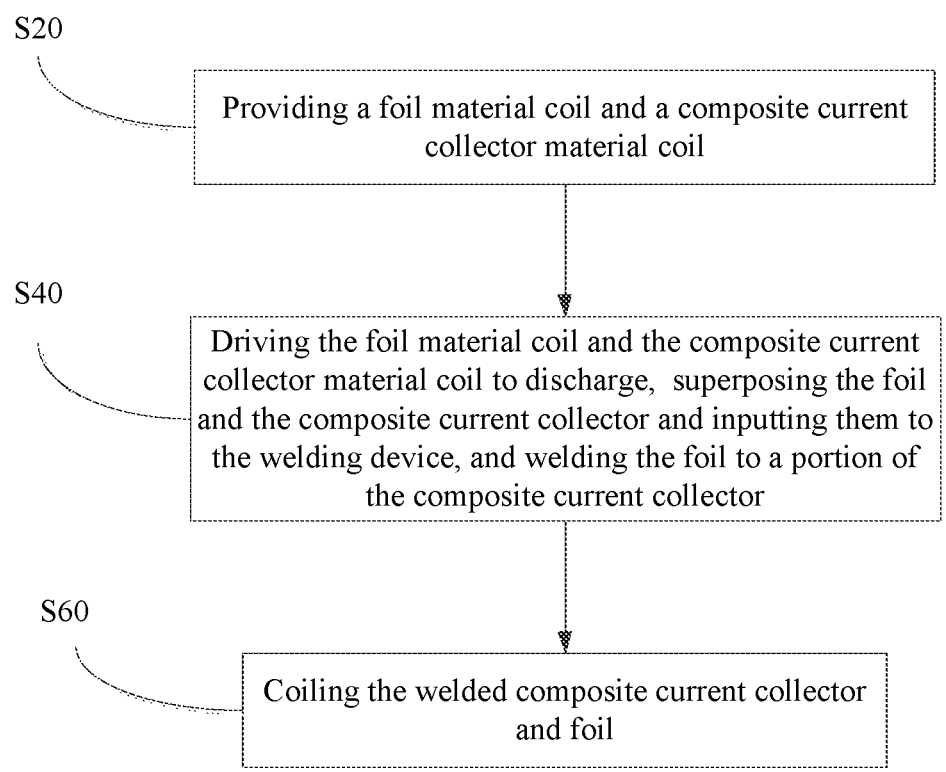
FIG. 4 is a flowchart of a third embodiment of a processing method for a secondary battery current collector according to an embodiment of the present disclosure.

It should be understand that the foil and the composite current collector are both made of thin materials, which may have low strength and may not withstand large tearing force. Therefore, it is required that the relative position of the foil and the composite current collector is maintained to be fixed during welding, otherwise, cracks may occur after welding, and in severe cases, strip breakage may occur such that the production cannot be performed continuously. To this end, as shown in FIG. 4, in step S40, it is also possible to overlap the foil and the composite current collector before welding. In this way, before being input to the welding station, the foil and the composite current collector can be conveyed in the same direction within a certain length and jointly conveyed to the welding station in an overlapped state so as to reduce the speed difference therebetween, such that the conveying speeds of them tend to be consistent to maintain their relative positions to be fixed, thereby improving the welding quality of the foil and the composite current collector.

Figure 5:
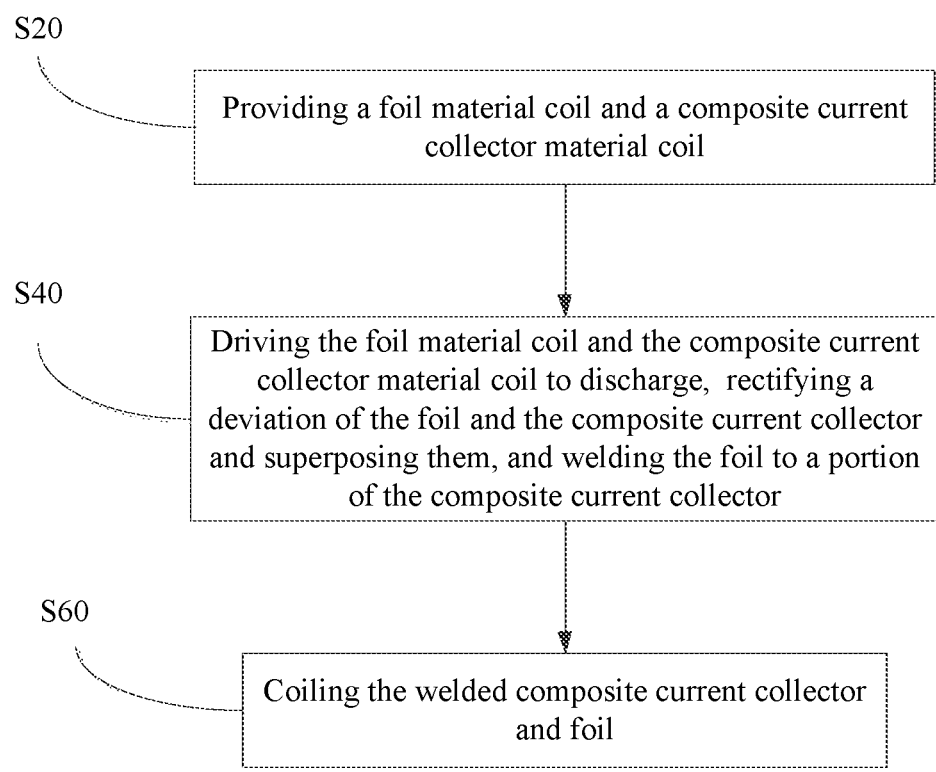
FIG. 5 is a flowchart of a fourth embodiment of a processing method for a secondary battery current collector according to an embodiment of the present disclosure.

As shown in FIG. 5, further, when the foil and the composite current collector are welded, there is a high requirement for overlapping dimension of the foil and the composite current collector. In order to ensure the accuracy of the position when the foil and the composite current collector overlap, it is also possible to rectify a deviation of the foil and the composite current collector before overlapping in step S40 to correct positions of the foil and the composite current collector in a convenient and quick manner, such that the overlapped foil and composite current collector can overlap at a predetermined position to meet requirements for the overlapping dimension.

On the other hand, the welding quality can be further ensured if the thin material enters the welding station in the horizontal direction. To this end, in step S40, the overlapped foil and the composite current collector can be further configured to be input to the welding station in the horizontal direction. Such arrangement can reduce defects such as bending and wrinkles occurring in the foil and the composite current collector during the conveying process, thereby ensuring the flatness during welding and improving the welding quality.

Further, the foil material coil can also be symmetrically disposed with the composite current collector material coil. For example, if the overlapped composite current collector and foil are input to the welding station in the horizontal direction, it is assumed that there is an imaginary plane which is parallel to the composite current collector and the foil and located between the composite current collector and the foil, such that the foil material coil and the composite current collector material coil may be symmetrically disposed on two sides of the imaginary plane. Thus, when the foil material coil and the composite current collector material coil discharge, both of them can enter the welding station via paths of a same length, which can reduce the difference in tension between the foil and the composite current collector and ensure the flatness of the foil and the composite current collector when they are overlapped.

It should be noted that various parameters of the ultrasonic welding may be selected by those skilled in the art according to the specific application environment, which is not limited in the present disclosure.

According to one embodiment, a 40 KHz ultrasonic welding head can be adopted. The diameter of the ultrasonic welding head is about 100 mm. The ultrasonic welding head is provided with welding teeth (the welding tooth portion) and the anvil block (the non-welding tooth portion) is surface treated.

Welding objects include a composite current collector having a thickness of 12 μm and an aluminum foil having a thickness of 9 Preset parameters include a pressure of 0.3 MPa, an amplitude of 16 μm and a speed of 50 m/min. After testing, the welding sample has a resistance value of about 70 mΩ, and a pulling force of about 15N.

The overall width of the welding teeth of the ultrasonic welding head can be selected in a range of 2 mm to 6 mm, for example 3 mm to 5 mm. The vibration frequency of the ultrasonic welding head is preferably 20K or 40K. The diameter of the ultrasonic welding head is selected in a range of 200 mm to 300 mm. The thickness of the aluminum foil can be selected in a range of 5 μm to 15 μm, preferably 8 μm to 12 μm. The thickness of the copper foil can be selected in a range of 4 μm to 12 μm, preferably 6 μm to 10 μm. The line speed of the ultrasonic welding head is preferably in a range of 30 m/min to 50 m/min. The cylinder pressure is preferably in a range of 0.2 MPa to 0.5 MPa.

Based on the above processing method for the secondary battery current collector, the present disclosure further provides a processing apparatus for a secondary battery current collector. The processing apparatus processes the secondary battery current collector by the processing method described above.

Figure 6:
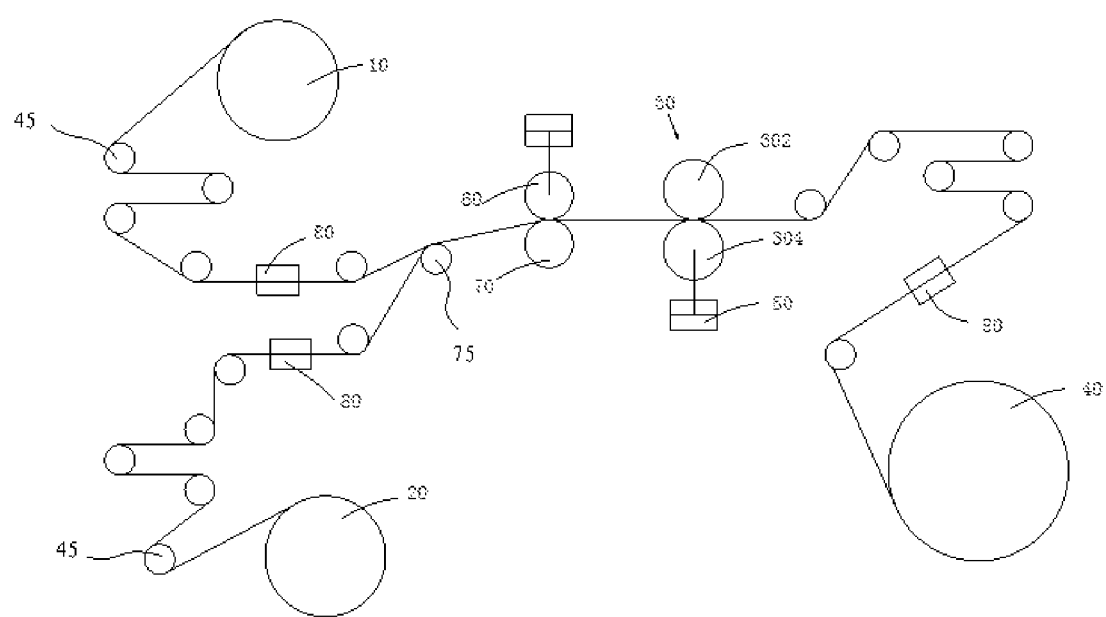
FIG. 6 is a schematic diagram of a processing apparatus for a secondary battery current collector according to an embodiment of the present disclosure.

Specifically, as shown in FIG. 6, the processing apparatus includes a foil uncoiling roller 10, a composite current collector uncoiling roller 20, a welding device 30, a coiling roller 40, a conveying roller 45, and the like. The foil uncoiling roller 10 is used for uncoiling the foil, and the composite current collector uncoiling roller 20 is used for uncoiling the composite current collector. The welding device 30 is used to weld and fix the foil to the composite current collector.

There are usually a plurality of conveying rollers 45 provided, which is respectively disposed on the discharging side of the foil uncoiling roller 10 and the composite current collector uncoiling roller 20 and the feeding side of the welding device 30, so as to convey the foil and the composite current collector to the welding device 30.

The welding device 30 includes a welding head 302 and an anvil block 304. A welding station is provided between the welding head 302 and the anvil block 304. The foil and the composite current collector pass through between the welding head 302 and the anvil block 304 and are welded and fixed together. When welding, the foil is welded to a portion of the composite current collector. After welding, the foil acts as a tab of the composite current collector, and the welding device outputs the current to the outside.

The coiling roller 40 is disposed on the discharging side of the welding device 30 for coiling the welded foil and composite current collector. The welded foil and composite current collector can be used as a substrate for an electrode plate and applied to the secondary battery.

According to the above description, the foil can be welded to the composite current collector by the processing apparatus, and the foil can act as a tab of the composite current collector such that the current in the battery cell is output through the connection of the foil and the composite current collector.

The foil and the composite current collector may be laser-welded, but the present disclosure is not limited thereto. In the present embodiment, the foil and the composite current collector are ultrasonic-welded. At this time, the welding head 302 is configured as an ultrasonic welding head 302. When the foil and the composite current collector arrive at the welding station, force is applied to the foil and the composite current collector by the vibration of the ultrasonic welding head 302, and the foil and the composite current collector rub against each other and are fused together.

Ultrasonic welding can effectively penetrate the plastic layer in the middle of the composite current collector, and respectively fuse the foil with metal layers on both sides of the plastic layer so as to increase the thickness of the metal, such that the current in the battery cell can be reliably output from the fused portion.

During the ultrasonic welding process, the welding device 30 can also be configured to continuously weld the foil to a portion of the composite current collector at the welding station. That is, welding of the foil and the composite current collector can be completed during the conveying process, and the conveying process can be performed without a pause.

In one embodiment, the ultrasonic welding head 302 and the anvil block 304 are respectively configured as cylinders so as to rotate with respect to each other, thereby achieving rolling contact. Thus, the foil and the composite current collector can be continuously conveyed to the welding station, and the foil and the composite current collector can be continuously welded. This aspect saves welding time and improves welding efficiency, and continuous welding marks can be formed on the foil and the composite current collector to ensure the reliability of the welding.

It should be understood that the manner in which continuous welding is achieved is not limited to that described above and other embodiments are applicable and will not be described in detail herein.

Further, the ultrasonic welding head 302 can be provided with a plurality of extrusion welding teeth (not shown in the drawings) on its circumferential face. The extrusion welding teeth can be configured as a tapered tooth structure which is similar to a gear structure. The anvil block 304 can be surface smoothed to reduce damage to the foil and the composite current collector during welding. At this time, the ultrasonic welding head 302 serves as a welding tooth portion, and the anvil block 304 serves as a non-welding tooth portion.

During the welding process, the extrusion welding teeth extrude the foil and the composite current collector and penetrate the plastic layer of the composite current collector. The foil is stretched under the action of the pressing force of the extrusion welding teeth, and is respectively fused with the metal layers on the upper and lower sides of the plastic layer, and thus the foil can be welded more sufficiently with the composite current collector.

Of course, the extrusion welding teeth are not limited to being disposed on the circumferential face of the ultrasonic welding head 302. Alternatively, the extrusion welding teeth may be disposed on the circumferential face of the anvil block 304. Accordingly, the ultrasonic welding head 302 can be surface smoothed. In this case, the anvil block 304 serves as a welding tooth portion and the ultrasonic welding head 302 serves as a non-welding tooth portion.

As shown in FIG. 6, the processing apparatus may further include a driving device 50. One of the ultrasonic welding head 302 and the anvil block 304 may be coupled to the driving device 50 in a transmission way, such that the contact force generated when the ultrasonic welding head 302 is in contact with the anvil block 304 can be adjusted to ensure the welding quality. In the present embodiment, the driving device 50 can be a cylinder.

As mentioned above, both the foil and the composite current collector are made of thin materials, which may have low strength and may not withstand large tearing force. Therefore, it is required that the relative position of the foil and the composite current collector is maintained to be fixed during welding. Otherwise, cracks may occur after welding, and in severe cases, strip breakage may occur such that the production cannot be performed continuously.

Here, in order to ensure the welding quality, the processing apparatus further includes a first pressure roller 60 and a second pressure roller 70 disposed in pairs. The first pressure roller 60 is disposed on the discharging side of the foil uncoiling roller 10 and the feeding side of the welding device 30, and the second pressure roller 70 is disposed on the discharging side of the composite current collector uncoiling roller 20 and on the feeding side of the welding device 30.

The first pressure roller 60 and the second pressure roller 70 have a gap therebetween for the passage of the composite current collector and the foil, and the foil and the composite current collector may be overlapped in the gap.

In this way, before being welded, the foil and the composite current collector can be conveyed in the same direction within a certain length and jointly conveyed to the welding station in an overlapped state, so as to reduce the speed difference between them. In this way, the conveying speeds of them tend to be consistent to maintain their relative position to be fixed, thereby improving the welding quality of the foil and the composite current collector.

At least one of the first pressure roller 60 and the second pressure roller 70 may be configured to be rotatable, which can reduce the resistance of the foil and the composite current collector during the conveying process so as to ensure the smoothness of the conveying. In the present embodiment, the first pressure roller 60 and the second pressure roller 70 are both configured to be rotatable, and the rotation direction should match the conveying direction of the foil and the composite current collector. That is, the line speed directions of the first pressure roller 60 and the second pressure roller 70 should coincide with the conveying direction of the foil and the composite current collector.

In addition, at least one of the first pressure roller 60 and the second pressure roller 70 may also be coupled to a cylinder in a transmission way, so that the first pressure roller 60 and the second pressure roller 70 can approach or move far away from each other to adjust a gap therebetween.

Further, a pre-pressure roller 75 may be disposed on the feeding side of the first pressure roller 60 and the second pressure roller 70. The pre-pressure roller 75 can press one of the foil and the composite current collector towards the other, such that the foil and the composite current collector are overlapped together before entering the gap between the first pressure roller 60 and the second pressure roller 70, so as to reduce the tension difference and the speed difference therebetween, thereby leading to the higher flatness and the more accurate relative position when both of them enter the first pressure roller 60 and the second pressure roller 70.

In an embodiment, the processing apparatus may further comprise a rectifying device 80, and the rectifying device 80 is disposed on the feeding side of the pre-pressure roller 75. The rectifying device 80 is configured to rectify the overlapping position of the foil and the composite current collector, so as to avoid a large position offset when they overlap.

According to an exemplary embodiment, the rectifying device 80 may be configured as a rectifying roller. The foil and the composite current collector are wrapped around the rectifying roller during the conveying process. The rectifying roller can control and drive the foil and the composite current collector to make a slight movement in a direction different from the conveying direction by a program in order to rectify the offset of the foil and the composite current collector during the conveying process, such that the overlapped foil and composite current collector can overlap at a predetermined position to meet dimensional requirements at the time of overlapping.

Further, a rectifying device 80 may also be provided on the feeding side of the coiling roller 40 to rectify the offset amount of a substrate for an electrode plate wound around the coiling roller 40.

During the discharging process, it is also required to control the tension of the foil and the composite current collector. Therefore, the processing apparatus may further include a tension adjusting device, and the tension adjusting device may be configured as a tension adjusting roller. The tension adjusting roller is movably disposed in the conveying path of the foil and the composite current collector, and the tension adjusting roller can control actions by a program so as to achieve an object of adjusting the tension.

The above description is only for the preferred embodiment of the present disclosure, and is not intended to limit the present disclosure, and various changes and modifications may be made by those skilled in the art. Any modifications, equivalent substitutions, improvements, etc. made within the spirit and principles of the present disclosure shall be included in the scope of this application.

What is claimed is:

1. A processing apparatus for a secondary battery current collector, comprising:
   a foil uncoiling roller;
   a composite current collector uncoiling roller;
   at least three conveying rollers comprising a first conveying roller, a second conveying roller, and a third conveying roller;
   a coiling roller;
   a welding device;
   rectifying devices configured to rectify a position offset between a foil and a composite current collector, wherein each of the rectifying devices is independent from each of the at least three conveying rollers, and the rectifying devices comprise a first rectifying device, a second rectifying device, and a third rectifying device;
   a pre-pressure roller configured to press one of the foil and the composite current collector to the other of the foil and the composite current collector to make the foil and the composite current collector overlap, wherein the pre-pressure roller is independent from each of the at least three conveying rollers, and
   a first pressure roller and a second pressure roller that are provided in pairs, wherein each of a first pressure roller and a second pressure roller is independent from each of the at least three conveying rollers,
   wherein the pre-pressure roller is disposed on a feeding side of the first pressure roller and the second pressure roller, and the first rectifying device is disposed between the pre-pressure roller and the foil uncoiling roller, the second rectifying device is disposed between the pre-pressure roller and the composite current collector uncoiling roller, and the third rectifying device is disposed between the welding device and the coiling roller;
   wherein the first conveying roller is disposed between the first rectifying device and the foil uncoiling roller, the second conveying roller is disposed between the second rectifying device and the composite current collector uncoiling roller, and the third conveying roller is disposed between the third rectifying device and the coiling roller;
   wherein both the foil uncoiling roller and the composite current collector uncoiling roller are disposed on a feeding side of the welding device, and the coiling roller is disposed on a discharging side of the welding device, and
   the welding device is configured to weld the foil to a portion of the composite current collector at the welding station.

2. The processing apparatus according to claim 1, further comprising a driving device, wherein one of the welding head and the anvil block is coupled to the driving device in a transmission way to adjust a contact force therebetween when they contact with each other.

3. The processing apparatus according to claim 1, wherein the first pressure roller and the second pressure roller have a gap therebetween for passage of the composite current collector and the foil, and the foil and the composite current collector are overlapped in the gap, and
   the first pressure roller is disposed on a discharging side of the foil uncoiling roller and the feeding side of the welding device, and the second pressure roller is disposed on a discharging side of the composite current collector uncoiling roller and the feeding side of the welding device.

4. A method for processing a secondary battery current collector with the processing apparatus according to claim 1, the method comprising:
   providing a foil material coil and a composite current collector material coil, and winding the foil material coil and the composite current collector material coil around a discharging roller;
   driving the foil material coil and the composite current collector material coil to discharge, jointly conveying the foil material coil and the composite current collector material coil to a welding device, and welding the foil material coil is fixed to a portion of the composite current collector by welding; and
   coiling, on a coiling roller, the composite current collector and the foil material that are welded to each other.

5. The processing apparatus according to claim 1, wherein the welding device comprises:
   a welding head; and
   an anvil block,
   wherein a welding station is disposed between the welding head and the anvil block, and
   the welding device is configured to weld a foil to a portion of a composite current collector at the welding station.

6. The processing apparatus according to claim 5, wherein the welding device is configured to continuously weld the foil to the portion of the composite current collector at the welding station.

7. The processing apparatus according to claim 6, wherein the welding head is configured as an ultrasonic welding head, the ultrasonic welding head being in rolling contact with the anvil block.

8. The processing apparatus according to claim 7, wherein a plurality of extrusion welding teeth is arranged on an outer circumferential face of one of the ultrasonic welding head and the anvil block.

9. The processing apparatus according to claim 1, wherein a path along which the foil is conveyed from the foil uncoiling roller to the welding station of the welding device has a same length as a path along which the composite current collector is conveyed from the composite current collector uncoiling roller to the welding station of the welding device.

10. The processing apparatus according to claim 1, further comprising a plurality of conveying rollers disposed on the discharging side of the foil uncoiling roller and the composite current collector uncoiling roller.

* * * * *